(12) United States Patent
Kim et al.

(10) Patent No.: US 7,131,128 B2
(45) Date of Patent: Oct. 31, 2006

(54) OPTICAL ACTUATOR

(75) Inventors: Seok-jung Kim, Gyeonggi-do (KR);
Kim Kwang, Gyeonggi-do (KR);
Chong-sam Chung, Gyeonggi-do (KR);
Hae-jung Suh, Gyeonggi-do (KR);
Sun-mo Kim, Seoul (KR); Jin-won Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 10/703,076

(22) Filed: Nov. 7, 2003

(65) Prior Publication Data

US 2004/0148619 A1 Jul. 29, 2004

(30) Foreign Application Priority Data

Jan. 23, 2003 (KR) .................... 10-2003-0004507

(51) Int. Cl.
*G11B 7/08* (2006.01)
*G11B 7/135* (2006.01)

(52) U.S. Cl. ............... 720/672; 720/681; 369/112.23; 369/118; 369/112.27

(58) Field of Classification Search ........... 369/112.27, 369/112.23, 118; 720/681, 672
See application file for complete search history.

(56) References Cited

U.S. PATENT DOCUMENTS

| 6,266,315 | B1 * | 7/2001 | Lee et al. ............ 369/112.01 |
| 6,341,106 | B1 * | 1/2002 | Nakanishi et al. ....... 369/44.28 |
| 6,388,840 | B1 * | 5/2002 | Ohwe ................. 360/244.1 |
| 6,434,088 | B1 * | 8/2002 | Ishizaki et al. ......... 369/13.33 |
| 6,507,554 | B1 * | 1/2003 | Son et al. .................. 720/683 |
| 6,538,974 | B1 * | 3/2003 | Wilde et al. .......... 369/112.01 |
| 6,587,421 | B1 * | 7/2003 | Wilde et al. .......... 369/112.01 |
| 6,633,531 | B1 * | 10/2003 | Hirono et al. ......... 369/112.23 |
| 6,657,942 | B1 * | 12/2003 | Lee et al. ............. 369/112.24 |
| 6,665,239 | B1 * | 12/2003 | Takahashi et al. ....... 369/44.23 |
| 6,785,201 | B1 * | 8/2004 | Shinohara et al. ....... 369/44.17 |
| 6,975,580 | B1 * | 12/2005 | Rettner et al. .............. 369/300 |
| 2001/0028536 | A1 * | 10/2001 | Sugimoto et al. ........... 360/245 |
| 2001/0055264 | A1 | 12/2001 | Cheong et al. |
| 2002/0024919 | A1 * | 2/2002 | Lee et al. ............. 369/112.24 |

FOREIGN PATENT DOCUMENTS

| JP | 62-15125 U | | 1/1987 |
| JP | 01064134 A | * | 3/1989 |
| JP | 6-236565 | | 8/1994 |

(Continued)

OTHER PUBLICATIONS

Office Action issued in Chinese Patent Application No. 2004100015179 on Aug. 26, 2005.

*Primary Examiner*—Andrea Wellington
*Assistant Examiner*—Matthew G Kayrish
(74) *Attorney, Agent, or Firm*—Stein, McEwen & Bui, LLP

(57) ABSTRACT

An optical pickup actuator for use with a recording medium includes a swing arm pivoting in a tracking direction with respect to the recording medium, a first driving unit pivoting the swing arm, an optical pickup facing the recording medium, an elastic member having one end fixed to the swing arm and a free end portion elastically deformable in a focus direction with respect to the recording medium, wherein the optical pickup is coupled to the free end portion of the elastic member, and a second driving unit deforming and driving the elastic member.

14 Claims, 5 Drawing Sheets

| FOREIGN PATENT DOCUMENTS | | |
|---|---|---|
| JP | 6-2233395 | 8/1994 |
| JP | 9-180222 | 7/1997 |
| JP | 2001-344777 | 12/2001 |
| JP | 2003-257057 | 9/2003 |
| WO | 02/29792 | 4/2002 |

* cited by examiner

OPTICAL ACTUATOR

CROSS-REFERENCE TO RELATED APPLICATIONS

This application claims the priority of Korean Patent Application No. 2003-4507 filed on Jan. 23, 2003 in the Korean Intellectual Property Office, the disclosure of which is incorporated herein in its entirety by reference.

BACKGROUND OF THE INVENTION

1. Field of the Invention

The present invention relates to an optical actuator, and, more particularly, to an optical actuator for controlling the position of a miniature optical pickup modularized so that an objective lens and an optical system are moved together.

2. Description of the Related Art

An optical pickup used for typical optical disk drives, such as CD players or DVD players, includes a fixed unit having optical elements such as a laser diode emitting light toward a recording medium, or a photodiode receiving the light reflected by the recording medium, a mobile unit having an objective lens focusing light emitted from the laser diode on the recording medium, and an actuator performing an accurate positional control of the light, that is, the focus and tracking control of the light through the objective lens, by adjusting the position of the mobile unit.

A smaller structure of the optical disk drive is needed for portable apparatuses such as notebook computers or PDAs. Accordingly, a miniature optical pickup is adopted in which the fixed unit and the mobile unit of the optical pickup are integrally formed as a module so that the whole unit is controlled in a focus direction and a tracking direction.

FIG. 1 shows the structure of a conventional actuator for the focus and tracking control of the miniature optical pickup.

Referring to the drawing, a swing arm 11 is provided that is capable of rotating in a direction T around a rotation shaft 10a provided on a base 10. A voice coil motor 12 is installed to rotate the swing arm 11 by an electromagnetic force. The voice coil motor 12 includes a coil 12c installed at one side of the swing arm 11, and a magnet 12a and a yoke 12b disposed under the coil 12c. This swing mechanism has the same structure as that of a hard disk drive for transferring a magnetic head, and is used for movement of the optical pickup 13 between tracks and a fine tracking control.

A pivot arm 16 having a miniature optical pickup 13 mounted thereon is coupled to the other side of the swing arm 11. That is, the swing arm 11 and the pivot arm 16 are coupled as both ends of a leaf spring 14 are inserted in one end portion of each of the swing arm 11 and the pivot arm 16, respectively. Accordingly, the pivot arm 16, which is supported by the swing arm 11, can pivot in a direction F. A focus coil 15a, generating an electromagnetic force for the pivot movement in an interaction with the magnet 15b installed on the base 10, is installed on a lower surface of the pivot arm 16.

Thus, for the movement of the optical pickup 13 between tracks and the tracking control, the voice coil motor 12 is operated to rotate the swing arm 11 in the direction T. For the focus control, the pivot arm 16 is rotated in the direction F by applying current to the focus coil 15a so as to move the optical pickup 13. A structure similar to that of a conventional optical pickup actuator is disclosed in PCT Publication No. WO 02/29792 A2.

However, in the above structure, the driving body moving to perform the focus control and the tracking control is too large. That is, the pivot arm 16, supported by the swing arm 11, moves up and down for the focus control, and the swing arm 11 rotates to the left and right, together with the pivot arm 16, for the tracking control. Since the weight of the driving body is heavy in both cases, the sensitivity of control is deteriorated. In particular, since the entire portion of the swing arm 11 must be rotated for the tracking control, a fine control is very difficult.

Therefore, an optical pickup actuator having an improved structure overcoming the above problems is required.

SUMMARY OF THE INVENTION

To solve the above and/or other problems, the present invention provides an optical actuator, exhibiting a high sensitivity, which is advantageous to a fine control in a focus direction and a tracking direction by reducing the weight of a driving body.

Additional aspects and/or advantages of the invention will be set forth in part in the description which follows and, in part, will be obvious from the description, or may be learned by practice of the invention.

According to an aspect of the present invention, there is provided an optical pickup actuator for use with a recording medium, the optical pickup comprising a swing arm pivoting in a tracking direction with respect to the recording medium, a first driving unit pivoting the swing arm, an optical pickup facing the recording medium, an elastic member having one end fixed to the swing arm and a free end portion elastically deformable in a focus direction with respect to the recording medium, wherein the optical pickup is coupled to the free end portion of the elastic member, and a second driving unit deforming and driving the elastic member.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
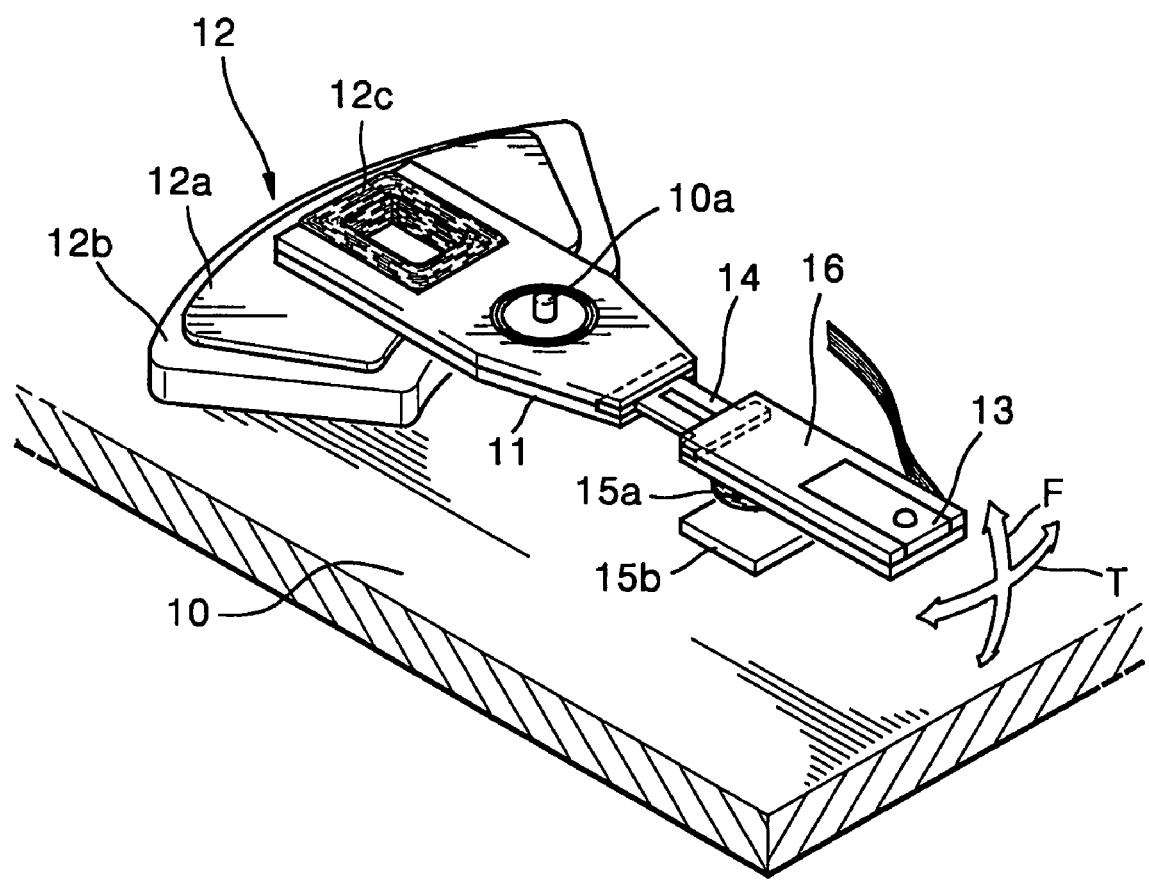
FIG. 1 is a perspective view illustrating a conventional optical pickup actuator.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
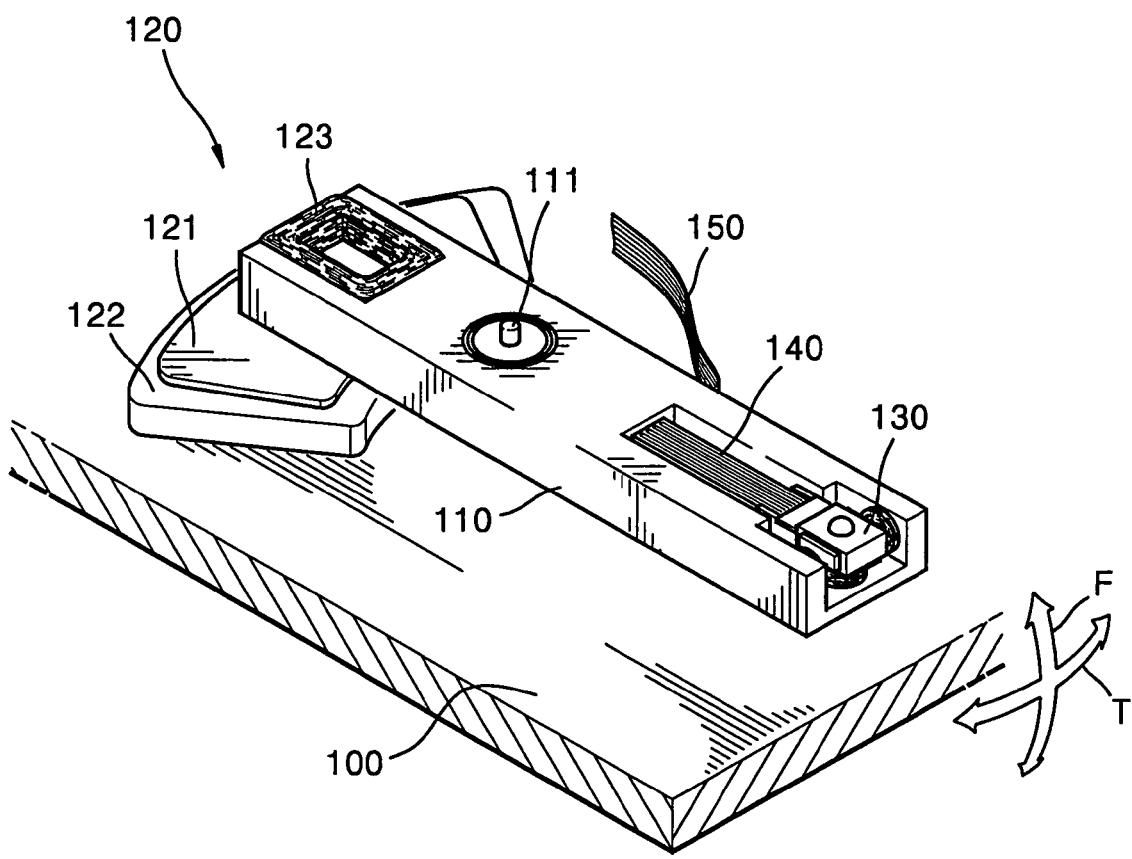
FIG. 2 is a perspective view illustrating an optical pickup actuator according to an embodiment of the present invention.
Figure 3A:
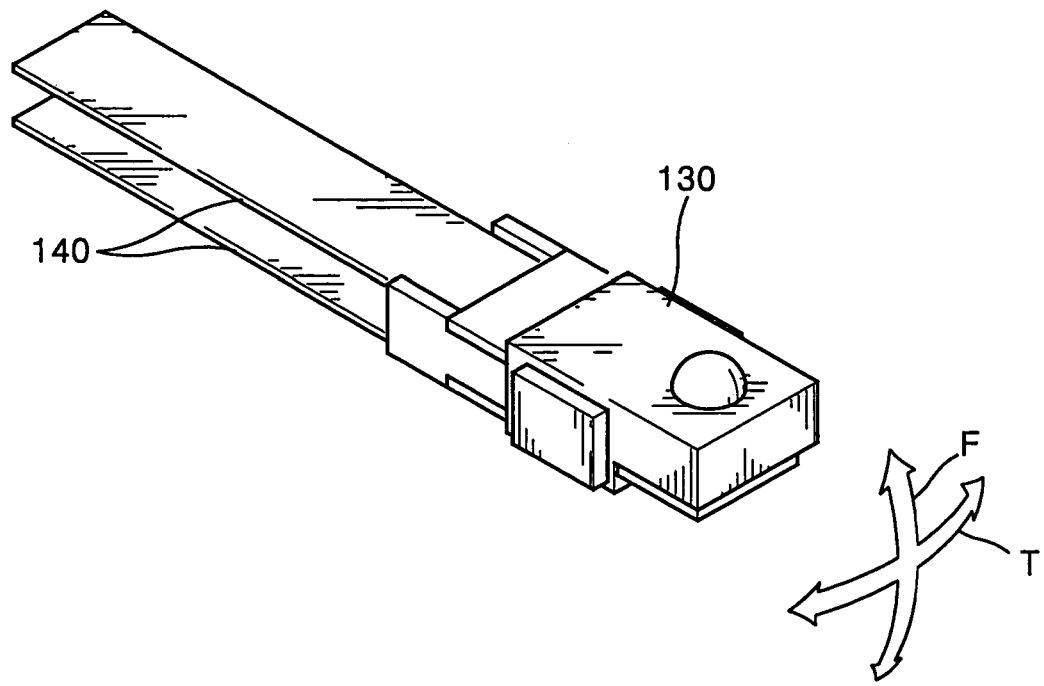
FIGS. 3A and 3B are perspective views illustrating examples of a leaf spring supporting an optical pickup of the optical pickup actuator of FIG. 2.
Figure 3B:
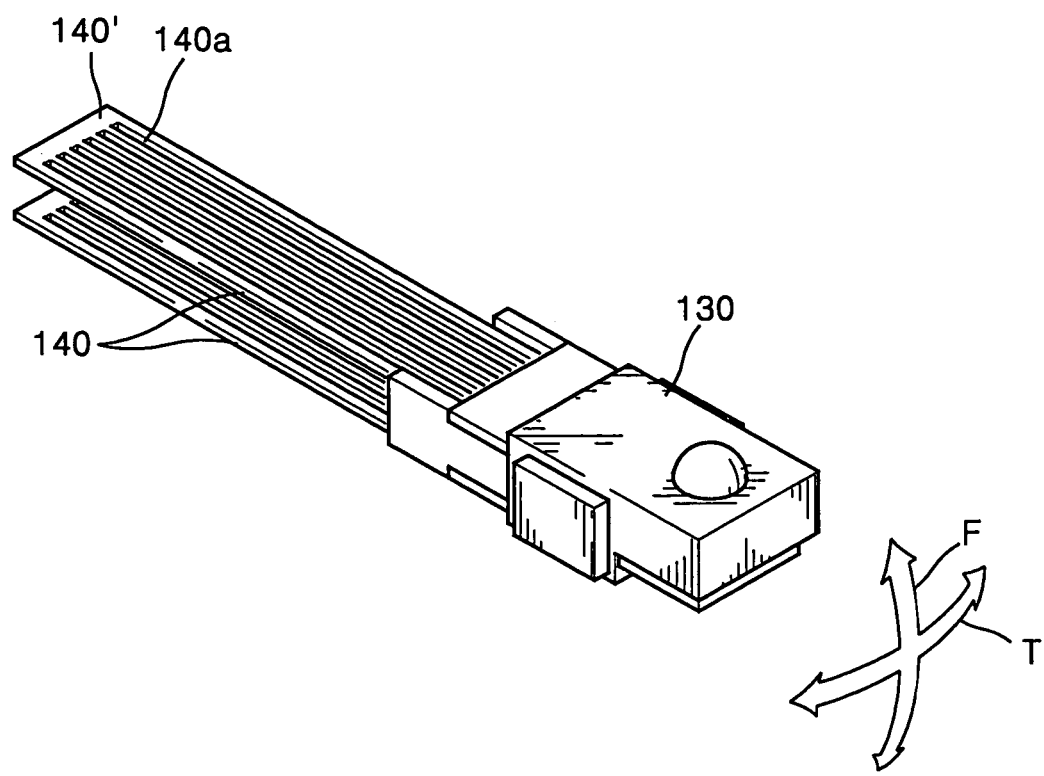

Referring to FIG. 2, in an optical pickup actuator according to an embodiment of the present invention, a swing arm 110 is rotatably installed on a rotation shaft 111 provided on a base 100 where a disk (not shown), which is a recording medium, is provided. The swing arm 110 is driven by a voice coil motor 120, including a first coil 123, a first magnet 121, and a yoke 122, to pivot in a tracking direction T, that is, in a direction across tracks of the disk. A leaf spring 140, which is an elastic member, is installed on the swing arm 110. One end portion of the leaf spring 140 is fixed on the swing arm 110, and the other end thereof is a free end portion which can be deformed in a focus direction F. A miniature optical pickup 130 is coupled to the free end portion. Thus, when the leaf spring 140 is deformed in the focus direction F, the optical pickup 130 performs a focusing operation. The leaf spring 140 can also be deformed in the tracking direction T. Although the amount of deformation in the tracking direction T is small compared to the focus direction F due to the structure of the leaf spring 140, a fine adjustment is possible. For the displacement in the tracking direction T, the width of the leaf spring 140 should be 10 times or more greater than the thickness thereof. In addition, to obtain a greater amount of deformation in the tracking direction T, a plurality of slits 140a can be formed in the lengthwise direction of a leaf spring 140', as shown in FIG. 3B. According to the results of simulation, a case in which the slits are present can secure an amount of deformation about 100 times greater than a case in which the slits are not present, so that a level close to a control sensitivity of the focus direction F is possible. Thus, when a very small amount of deformation for tracking control is acceptable, the leaf spring 140 having no slits as shown in FIG. 3A can be used. If the amount of deformation should be close to a level for the focus control, the leaf spring 140' with the slits 140a as shown in FIG. 3B is preferably used.

Figure 4:
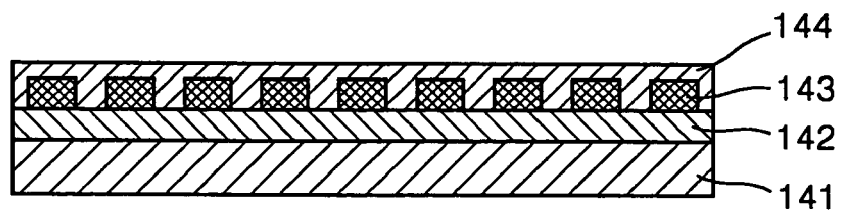
FIG. 4 is a sectional view illustrating a leaf spring shown in FIG. 2.

As shown in FIG. 4, the leaf spring 140 has a structure in which an insulation layer 142, a wiring 143, and a protective layer 144 are sequentially deposited on a main body made of beryllium copper or stainless steel. The wiring 143 electrically connects a cable 150 connected to the optical pickup 130 and a main circuit (not shown) of the disk drive, so as to form a passage of signal transmission. The insulation layer 142 insulates the main body 141 from the wiring 143. The protective layer 144 protects the wiring 143 against damage. Thus, the optical pickup 130 is supported by the leaf spring 140 which simultaneously performs an electric connection function, and an elastic support function and can be displaced thereby.

Figure 5:
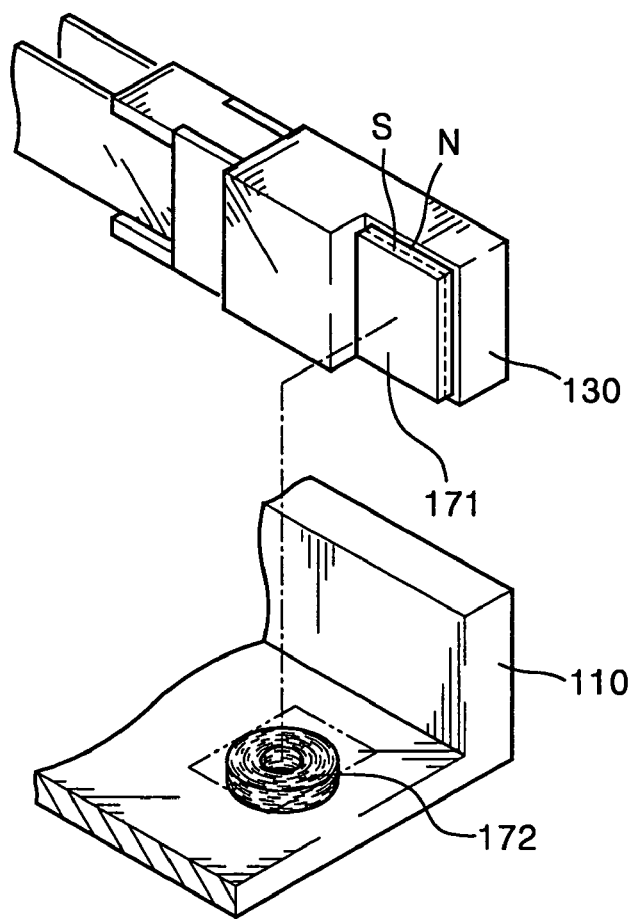
FIGS. 5 through 7 are views illustrating examples of a mechanism to drive the optical pickup of the optical pickup actuator of FIG. 2.
Figure 6:
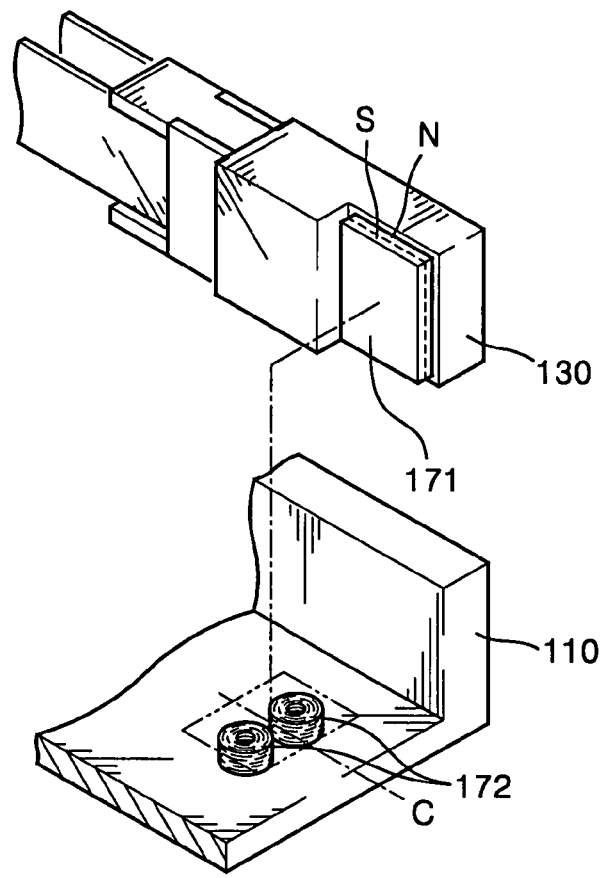
Figure 7:
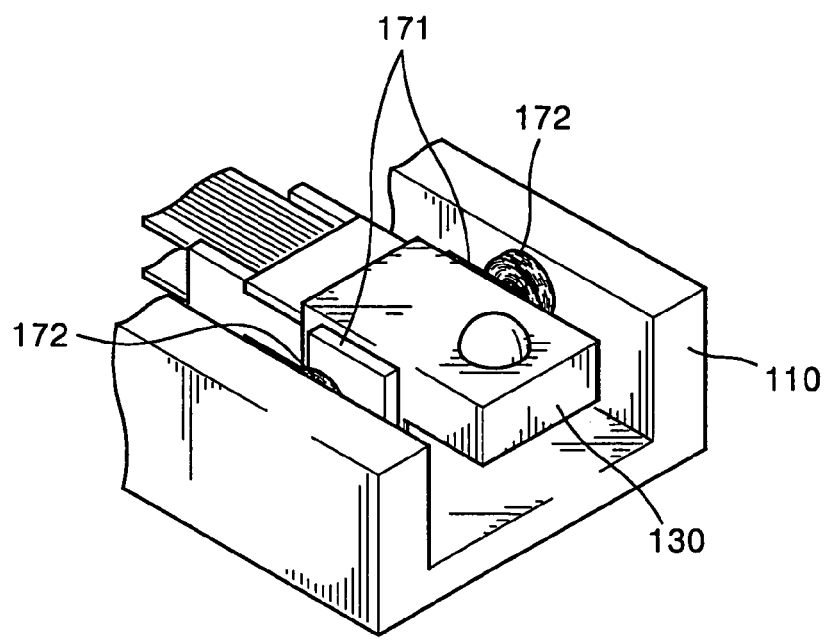

Examples of a driving mechanism to displace the optical pickup 130 supported by the leaf spring 140 are shown in FIGS. 5 through 7.

Referring to FIG. 5, a driving mechanism as a structure considering only driving in the focus direction F includes a second magnet 171 installed on a lower surface of the optical pickup 130 and a second coil 172 installed on the swing arm 110 to face the second magnet 171. The second coil 172 functions as an electromagnet in which the directivity of magnetic poles are changed according to the supply of current. Thus, the second coil 172, in an interaction with the second magnet 171, which is a permanent magnet, generates a solenoid force, which is an attractive force or a repulsive force, to displace the optical pickup 130.

FIG. 6 shows a structure in which a pair of second coils 172 are symmetrically arranged with respect to a center line C of the second magnet 171 so that not only a focus control, but also a tilt control, can be performed. That is, when current having the same direction and amount is applied to both of the second coils 172, the optical pickup 130 can move up and down to be parallel to the disk to perform a focus control. When different current is applied to the second coils 172, the optical pickup 130 is inclined to one side so that the tilt control can be performed. Thus, for a case requiring a tilt control, the present structure can be adopted.

FIG. 7 shows a structure in which the second magnets 171 are installed on both side walls of the optical pickup 130, and the second coils 172 are installed on both side walls of the swing arm 110 facing the second magnets 171, so that a fine tracking control can be performed. That is, since the swing arm 110 pivots in the tracking direction T, the tracking control can be performed by moving the swing arm 110 using the voice coil motor 120. When a more fine tracking control is needed, the control can be performed by deforming the leaf spring 140 in the tracking direction T. As described above, the driving force is a solenoid force generated between the second coil 172, which functions as an electromagnet, and the second magnet 171, which is a permanent magnet.

In addition to the above examples, a variety of driving mechanisms can be made by combining the above structures. For example, a driving mechanism capable of a focus control and a fine tracking control can be obtained by combining the structures of FIGS. 5 and 7. Also, a driving mechanism capable of a focus control, a fine tracking control, and a tilt control can be obtained by combining the structures of FIGS. 6 and 7. Accordingly, an appropriate structure can be selected for a required performance.

In the above structures, as the voice coil motor 120 pivots the swing arm 110, the optical pickup 130 is greatly moved in the tracking direction. Thus, the action to quickly search for a desired track crossing the tracks, or a tracking control made on the searched track, is controlled by the swing arm 110 by the voice coil motor 120. The focus control, the fine tracking control, and the tilt control on a corresponding track is performed by deforming the leaf spring 140, using the second magnet 171 and the second coil 172.

As described above, the optical pickup actuator according to embodiments of the present invention has the following merits.

First, since the positional control of the optical pickup is dependent not on the movement of a relatively large member, such as the swing arm or the pivot arm, but on the elastic deformation of the leaf spring, which is a relatively small and light member, a response feature is improved and a control sensitivity is superior.

Second, since the fine tracking control and the tilt control, as well as the focus control, are possible by selecting the driving mechanism, the optical pickup actuator can be applied to a disk drive apparatus requiring a high accuracy.

Third, since the pivot arm normally used in the conventional technology is not needed, the number of parts is reduced, so that the manufacture of a lighter and more compact product is made possible.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup actuator for use with a recording medium, the optical pickup actuator comprising:
   a swing arm pivoting in a tracking direction with respect to the recording medium;
   a first driving unit pivoting the swing arm;

an optical pickup facing the recording medium;
an elastic member having one end fixed to the swing arm and a free end portion elastically deformable in a focus direction with respect to the recording medium, wherein the optical pickup has an electrical connection and is mounted entirely on the free end portion of the elastic member; and
a second driving unit deforming and driving the elastic member;
wherein the second driving unit comprises:
   at least one coil provided on an end of the swing arm and functioning as an electromagnet according to a supply of current; and
   at least one magnet facing the at least one coil, wherein the at least one magnet is provided on the optical pickup to generate a solenoid force with the corresponding coil;
wherein the at least one magnet is provided on a surface of the optical pickup opposite of the recording medium;
wherein the at least one coil comprises a pair of coils, so that the pair of coils is symmetrically arranged at both sides with respect to a center line of the at least one magnet; and
wherein each coil of the pair of coils provides force in the same direction to provide focus control, and each coil of the pair of coils provides force in opposite directions to provide tilt control.

2. The optical pickup actuator as claimed in claim 1, wherein the elastic member has a width 10 times or more greater than a thickness of the elastic member.

3. The optical pickup actuator as claimed in claim 1, wherein the elastic member is also elastically deformable in the tracking direction.

4. The optical pickup actuator as claimed in claim 1, further comprising a wiring provided in the elastic member electrically connecting the optical pickup and a main circuit.

5. The optical pickup actuator as claimed in claim 4, wherein the elastic member further comprises:
   a main body of the elastic member;
   an insulation layer insulating the main body and the wiring; and
   a protective layer coated on the wiring.

6. The optical pickup actuator as claimed in claim 5, wherein the main body comprises beryllium copper or stainless steel.

7. The optical pickup actuator as claimed in claim 1, wherein at least one slit is formed in the elastic member in a lengthwise direction.

8. The optical pickup actuator as claimed in claim 1, wherein the first driving unit comprises:
   a coil provided at an end of the swing arm; and
   a magnet generating an electromagnetic force with current flowing in the coil of the first driving unit.

9. An optical pickup actuator for use with a recording medium, the optical pickup actuator comprising:
   a swing arm pivoting in a tracking direction with respect to the recording medium;
   a first driving unit pivoting the swing arm;
   an optical pickup facing the recording medium;
   an elastic member having one end fixed to the swing arm and a free end portion elastically deformable in a focus direction with respect to the recording medium, wherein the optical pickup is coupled to the free end portion of the elastic member; and
   a second driving unit deforming and driving the elastic member;
   wherein the second driving unit comprises:
      at least one coil provided on an end of the swing arm and functioning as an electromagnet according to a supply of current; and
      at least one magnet facing the at least one coil, wherein the at least one magnet is provided on the optical pickup to generate a solenoid force with the corresponding coil; and
   wherein the at least one magnet comprises a magnet provided at a surface of the optical pickup perpendicular to the recording medium.

10. The optical pickup actuator as claimed in claim 9, wherein the at least one magnet further comprises a first magnet provided on a surface of the optical pickup opposite of the recording medium; and
   wherein the magnet provided at a surface of the optical pickup perpendicular to the recording medium is a second magnet.

11. The optical pickup actuator as claimed in claim 10, wherein the at least one coil facing the first magnet comprises a pair of coils, so that the pair of coils are symmetrically arranged at both sides with respect to a center line of the first magnet.

12. The optical pickup actuator as claimed in claim 10, further comprising a third magnet provided at a surface of the optical pickup opposite of the second magnet.

13. The optical pickup actuator as claimed in claim 12, wherein the at least one coil facing the first magnet comprises a pair of coils, so that the pair of coils are symmetrically arranged at both sides with respect to a center line of the first magnet.

14. The optical pickup actuator as claimed in claim 1, wherein the elastic member is a leaf spring.

* * * * *